United States Patent Office.

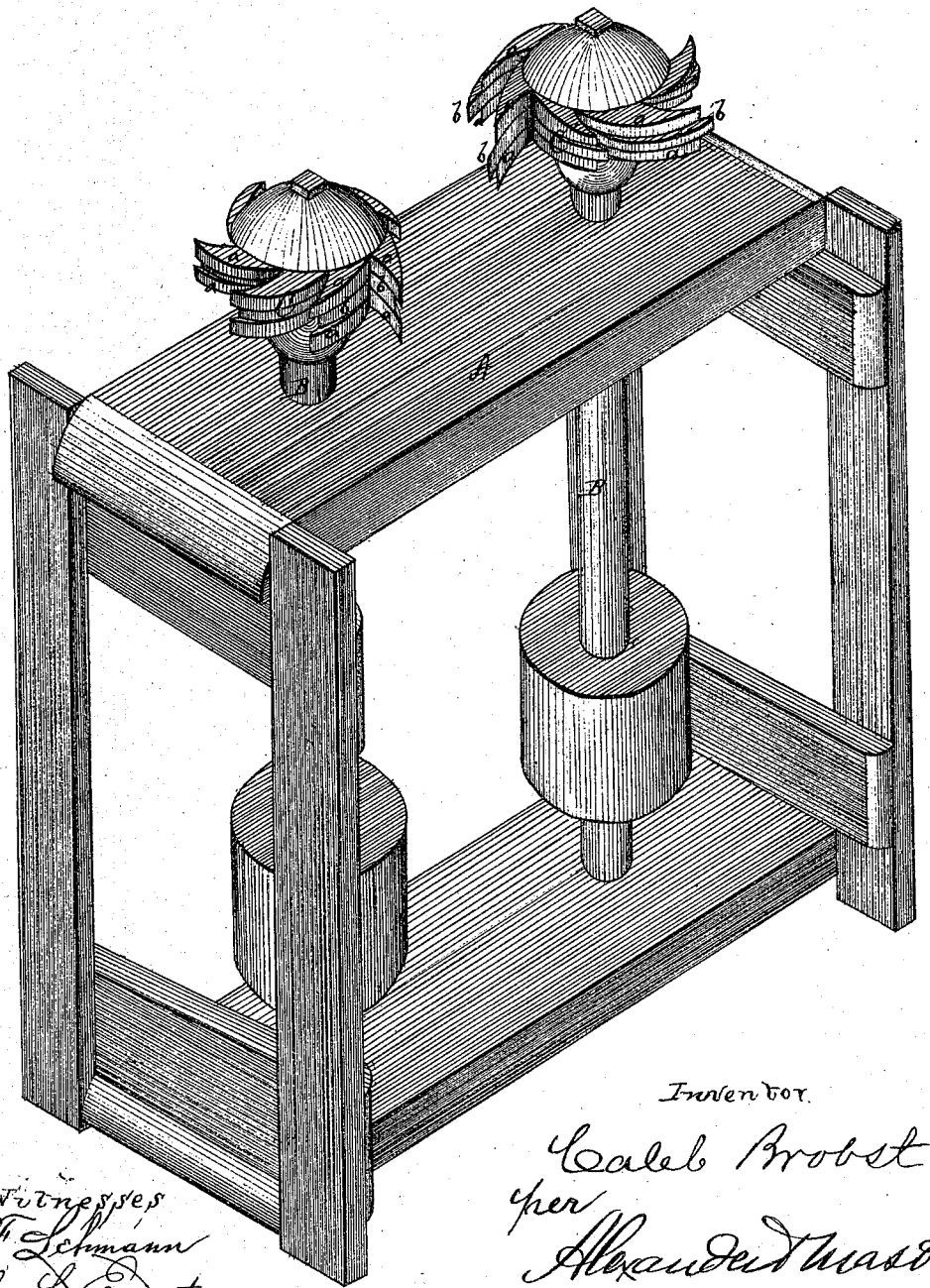

CALEB BROBST, OF WINAMAC, INDIANA.

Letters Patent No. 105,417, dated July 19, 1870.

IMPROVEMENT IN CUTTERS FOR TONGUING AND GROOVING.

The Schedule referred to in these Letters Patent and making part of the same.

*To all whom it may concern:*

Be it known that I, CALEB BROBST, of Winamac, in the county of Pulaski and in the State of Indiana, have invented certain new and useful Improvements in Saws for Tongue and Grooving Lumber; and do hereby declare that the following is a full, clear, and exact description thereof, reference being had to the accompanying drawing and to the letters of reference marked thereon making a part of this specification.

The nature of my invention consists in the construction of saws for cutting tongues and grooves in lumber, as will be hereinafter fully set forth.

In order to enable others skilled in the art to which my invention appertains to make and use the same, I will now proceed to describe its construction and operation, referring to the annexed drawing, which represents a perspective view of a frame, with mandrels and my saws attached.

In the drawing, I have represented a frame, A, merely to show the mandrels B B, upon which my saws D D are secured.

Each saw is made of three plates, $a$, $a$, and $b$, each having six teeth, and placed on top of each other, and firmly riveted, or otherwise secured together. The two plates $a$ $a$ are of exactly the same size and shape, and placed one on each side of the third saw-plate, $b$.

The teeth on this plate $b$ are made either larger or smaller than the teeth on the plates $a$ $a$, so as either to project beyond them, or allow the teeth on the plates $a$ to project beyond the teeth on the plate $b$, enabling the saws to cut either grooves or tongues.

These saws are far superior to the usual head and knives in dressing all kinds of flooring and wide lumber. The saws will dress knotty and cross-grain lumber smooth, where the knives will tear out and make rough lumber.

Having thus fully described my invention,

What I claim as new, and desire to secure by Letters Patent, is—

The cutter-heads C and C', composed of the cutters $a$ $b$ $a$, when all the parts are constructed and arranged in the manner shown and described, and for the purposes set forth.

In testimony that I claim the foregoing, I have hereunto set my hand this 20th day of November, 1869.

CALEB BROBST.

Witnesses:
WILLIAM B. JENKINS,
FRANCIS M. HARRIS.